(12) United States Patent
Redelmeier

(10) Patent No.: US 9,687,808 B2
(45) Date of Patent: Jun. 27, 2017

(54) METHOD AND SYSTEM FOR CONTROLLING A HYDROCRACKER AND FRACTIONATOR

(71) Applicant: SHELL OIL COMPANY, Houston, TX (US)

(72) Inventor: Robert James Redelmeier, Pearland, TX (US)

(73) Assignee: SHELL OIL COMPANY, Houston, TX (US)

( * ) Notice: Subject to any disclaimer, the term of this patent is extended or adjusted under 35 U.S.C. 154(b) by 234 days.

(21) Appl. No.: 14/339,739

(22) Filed: Jul. 24, 2014

(65) Prior Publication Data

US 2015/0076036 A1 Mar. 19, 2015

Related U.S. Application Data

(60) Provisional application No. 61/858,774, filed on Jul. 26, 2013.

(51) Int. Cl.
| | |
|---|---|
| *B01J 19/00* | (2006.01) |
| *C10G 47/00* | (2006.01) |
| *C10G 47/36* | (2006.01) |
| *C10G 7/12* | (2006.01) |

(52) U.S. Cl.
CPC ............ *B01J 19/0033* (2013.01); *C10G 7/12* (2013.01); *C10G 47/00* (2013.01); *C10G 47/36* (2013.01); *B01J 2219/00164* (2013.01); *C10G 2300/4081* (2013.01)

(58) Field of Classification Search
CPC .................................. B01D 3/42; C10G 7/12
See application file for complete search history.

(56) References Cited

U.S. PATENT DOCUMENTS

| | | |
|---|---|---|
| 3,214,366 A | 10/1965 | Brennan et al. |
| 6,402,935 B1 | 6/2002 | Kalnes |
| 7,041,211 B2 | 5/2006 | Kalnes |
| 7,419,582 B1 | 9/2008 | Hoehn et al. |

(Continued)

FOREIGN PATENT DOCUMENTS

| | | |
|---|---|---|
| CN | 102078702 | 6/2011 |
| CN | 102250635 | 11/2011 |
| EP | 70926 | 2/1983 |

(Continued)

*Primary Examiner* — Randy Boyer
*Assistant Examiner* — Juan Valencia
(74) *Attorney, Agent, or Firm* — Charles W. Stewart

(57) ABSTRACT

A method and system for controlling a hydrocracker and fractionator reaction loop is disclosed. The method and system utilizes a sidedraw tray within the fractionator distillation zone upon which liquid is collected. This liquid is withdrawn as a sidedraw stream. The withdrawal of the liquid from the sidedraw tray is controlled based on the level of liquid on the sidedraw tray rather than at a set or determined flow rate. The sidedraw stream is separated into a first stream and a product stream. Unlike other processes where the flow rate of the product stream is set and the internal reflux flow rate varies, the method involves fixing the flow rate of the first stream that is returned to the distillation zone of the fractionators with the flow rate of the product stream being set so as to control the liquid level on the sidedraw tray.

5 Claims, 1 Drawing Sheet

(56) References Cited

U.S. PATENT DOCUMENTS

2011/0226607 A1* 9/2011 Anderson ................ B01D 3/32
203/84

FOREIGN PATENT DOCUMENTS

| JP | 2000282056 | 10/2000 |
|----|------------|---------|
| WO | 2012052116 | 4/2012  |
| WO | 2012152116 | 4/2012  |

* cited by examiner

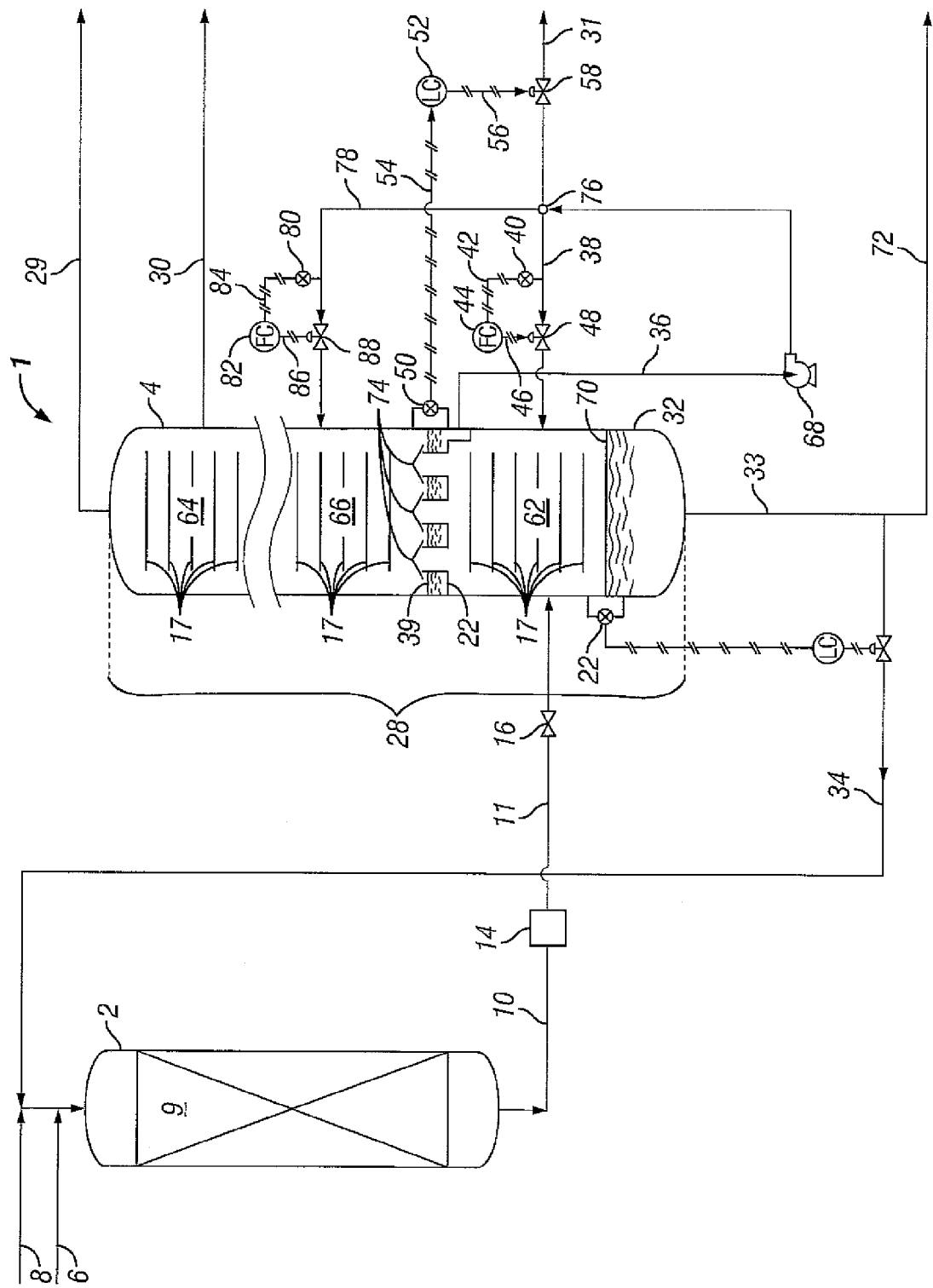

METHOD AND SYSTEM FOR CONTROLLING A HYDROCRACKER AND FRACTIONATOR

PRIORITY CLAIM

The present non-provisional application claims the benefit of U.S. Provisional Application No. 61/858,774, filed on Jul. 26, 2013, the disclosures of which are incorporated herein by reference.

FILE OF THE INVENTION

This invention relates to a method and system for controlling a hydrocracking unit including a hydrocracking reactor and an associated fractionator.

BACKGROUND OF THE INVENTION

Hydrocracking is a process in which heavy oil fractions recovered from crude oil are combined with hydrogen gas and subjected to high temperatures and pressures in one or more reactors filled with catalyst. The catalyst helps the longer chain hydrocarbons in the heavy oil fractions break or "crack" into smaller hydrocarbon molecules that eventually form kerosene, naptha, and gasoil components.

The effluent from the hydrocracker reactor is typically fed to a distillation column or fractionator. The fractionator separates the feed stream into different fractions of liquid hydrocarbons each having a desired boiling range. Generally speaking, "lighter" hydrocarbons (e.g., liquid hydrocarbons having a lower boiling point) are withdrawn from the top and sides of the fractionator as an overhead and sidedraw streams. Heavier fractions (e.g., hydrocarbons having a higher boiling point) collect in the bottom of the fractionator and are known as bottoms. The bottoms are recycled to the hydrocracker reactor or undergo other processing.

The hydrocracker reactor and fractionator work together, in conjunction with other process equipment such as heaters, heat exchangers, phase separators, pumps, compressors, etc., and the operating conditions of one can be dependent on or tied to the other. For example, an operator or an automated control system monitors the yield of fractionator bottoms, which may be reflected by changes in the level of bottoms collected in the bottom section of the fractionator or by changes in the flow of fractionator bottoms effluent. If, in one instance, an operator of the hydrocracking unit sees an unexpected increase in the yield of fractionator bottoms, then the operator should seek to determine the cause of the increase. The increase in fractionator bottoms could be due to, for example, a reduction in conversion ("cracking") in the hydrocracker, thus resulting in sending heavier feed to the fractionator. Or, the increase could be due to separation problems in the fractionator. If the increase is due to a reduction in hydrocracker conversion, then the usual adjustment is to increase the hydrocracker reaction bed temperature. If the increase is due to separation problems in the fractionator, then the usual adjustment is to increase the sidedraw flow rate.

A careful examination of the fractionator operation can provide an indication of the problem, but such an examination can sometimes be time consuming. Also, certain solutions such as making pressure corrections to the fractionator operation are difficult adjustments to make in the timely manner required for controlling a continuous production processes. The application of the method of controlling the fractionator by increasing its sidedraw product flow risks pulling too much liquid from the fractionator column which can cause off-specification product. And, increasing hydrocracker reaction temperature in order to control the fractionator can increase energy costs and result in "re-cracking" of hydrocarbons into undesired lighter fractions such as naptha.

Among these options, however, the control of the fractionator operation by adjusting the hydrocracker reaction bed temperature can at times be a preferred approach due to a lower risk of producing off-spec product. However, over time and after several temperature adjustments, "re-cracking" inefficiencies can increase to a point where there is significant economic loss due to over cracking.

Considering the above-noted problems, there is a need for an improved system and method for controlling the hydrocracker reactor and fractionator of a hydrocracking process and system. Such a system and method should provide an operator with a greater level of certainty in controlling unexpected increases in fractionator bottoms yield and provide a more efficient process control methodology for controlling the fractionator and hydrocracker reaction loop.

SUMMARY OF THE INVENTION

Accordingly, the invention is directed to a method of controlling the operation of a fractionator and hydrocracker reaction loop. The method comprises providing a fractionator for receiving a hydrocracker effluent yielded from a hydrocracker reactor as a fractionator feed, wherein the fractionator defines a distillation zone that includes a bottom zone, an upper zone, and an intermediate zone between the bottom zone and the upper zone, wherein the intermediate zone has a sidedraw tray. The fractionator feed is introduced into the bottom zone of the fractionator. A liquid level of hydrocarbons having a desired boiling range is collected on the sidedraw tray from which a sidedraw stream of the hydrocarbons is withdrawn. The sidedraw stream is separated into a first stream and a product stream with the first stream being introduced into the distillation zone. Responsive to a difference between a measured flow of the first stream and a desired flow of the first stream, the flow of the first stream is controlled. Responsive to a difference between a measured liquid level on the sidedraw tray and a desired liquid level on the sidedraw tray, the flow of the product stream is controlled. The product stream is passed downstream of the fractionator.

Another aspect of the invention encompasses a system for controlling the operation of a fractionator and hydrocracker reaction loop. The system comprises a hydrocracker reactor that produces a hydrocracker effluent; a fractionator for receiving the hydrocracker reactor effluent as a fractionator feed, wherein the fractionator defines a distillation zone; a sidedraw tray within the distillation zone providing a volume of liquid hydrocarbons having a desired boiling range as a sidedraw stream, wherein the sidedraw tray prevents overflow of the liquid hydrocarbons within the distillation zone; means for separating the sidedraw stream into first stream and a product stream; a first flow control system for comparing a measured flow of the first stream with a desired flow of the first stream and for controlling the flow of the first stream in response to a difference between the measured flow and the desired flow; and a conduit for passing the product stream downstream of the fractionator.

BRIEF DESCRIPTION OF THE DRAWINGS

FIG. 1 is a schematic diagram illustrating an embodiment of the process system and associated process flows of the invention that includes a hydrocracking reactor, a fractionator, and control systems.

DETAILED DESCRIPTION OF THE INVENTION

The following detailed description is not intended in a limiting sense and is made solely for the purpose of illustrating the general principles of the invention. The various features and advantages of the present invention may be more readily understood with reference to the following detailed description taken in conjunction with the accompanying drawings.

FIG. 1 schematically illustrates process system 1, which is an embodiment of the invention that includes a hydrocracking reactor 2 and a fractionator 4. Those skilled in the art understand that additional components such as pumps, heaters, heat exchangers, phase separators, compressors, gas recovery units, piping, controllers, instrumentation etc., can be a part of any particular refining process. Various of these components are not specifically discussed in this detailed description; because, the practice of the invention is not limited to any one specific design of a process unit that includes a hydrocracking reactor, a fractionator unit and various control system elements as described herein. Those skilled in the art, however, can readily adapt the concepts and practices of the invention to fit the design of a particular hydrocracking reactor and fractionator process arrangement.

In the operation of process system 1, a heavy hydrocarbon feedstream passing through line 6 and a hydrogen feedstream passing through line 8 are combined and introduced as a feed into the hydrocracking reaction zone 9. Hydrocracking reaction zone 9 is defined by hydrocracking reactor 2.

The hydrocarbon feedstocks that are suitable for use as the heavy hydrocarbon feedstream of the invention include all mineral oils and synthetic oils (e.g., shale oil, tar sand products, etc) and fractions thereof. Non-limiting examples of suitable hydrocarbon feedstocks include those containing hydrocarbon components boiling above 288° C. (550° F.), such as atmospheric gas oils, vacuum gas oils, deasphalted residue, vacuum residue, atmospheric residue, and gas oils from conversion units such as fluidized catalytic cracking units, coker units, or visbreaking units.

Generally, the heavy hydrocarbon feedstream should comprise at least 20 vol. % heavy hydrocarbons boiling above 288° C. (550° F.). But, it is more desirable for the heavy hydrocarbon feedstream to comprises at least 50 vol. % of heavy hydrocarbons boiling above 288° C. (550° F.), and it is especially desirable for the heavy hydrocarbon feedstream to comprise at least 75 vol. % of heavy hydrocarbons boiling above 288° C. (550° F.). These heavy hydrocarbons are converted in the hydrocracking reactor 2 to lower boiling hydrocarbons having a boiling temperature of less than 288° C. (550° F.).

Typically, the per pass conversion of the heavy hydrocarbons to lower boiling hydrocarbons in the hydrocracking reaction zone 9 is to exceed 15% such as being in the range of from 15% to 75%, but it is preferable for the per pass conversion to exceed 20% such as being in the range of from 20% to 60%.

Contained within hydrocracking reaction zone 9 is a hydrocracking catalyst that facilitates conversion of heavy hydrocarbons into lighter hydrocarbons. Various hydrocracking catalyst compositions are well known to those skilled in the art and any suitable hydrocracking catalyst may be loaded within hydrocracking reaction zone 9. For instance, the hydrocracking catalysts described in U.S. Pat. No. 7,419,582, which patent is hereby incorporated herein by reference, include some of the catalyst compositions that may suitably be used. Examples of other hydrocracking catalyst compositions that may suitably be used are described in U.S. Pat. No. 7,041,211 and U.S. Pat. No. 6,402,935, both such patents are incorporated herein by reference.

The hydrocracking reactor 2 is operated at conditions, such as, temperature, pressure, hydrogen-to-hydrocarbon feed ratio, and hourly space velocity, that are suitable for the particular feed stream being processed, the particular catalyst composition used, and the final desired product. Those skilled in the art are well aware of the operating conditions required for a particular hydrocracker unit.

Typically, however, the heavy hydrocarbon feedstream is contacted with the hydrocracking catalyst within hydrocracking reaction zone 9 in the presence of hydrogen at a temperature exceeding 200° C. (392° F.). Usually, the temperature is in the range of from 250° C. (482° F.) to 480° C. (896° F.), but advantageously it is in the range of from 320° C. (392° F.) to 450° C. (842° F.), and, preferably, it is in the range of from 330° C. (626° F.) to 435° C. (815° F.).

The operating pressure of hydrocracking reaction zone 9 is generally greater than 1 MPa (145 psi) and usually it is in the range of from 2 MPa (290 psi) to 25 MPa (3626 psi), and, preferably, it is in the range of from 3 MPa (435 psi) to 20 MPa (2900 psi).

The space velocity at which hydrocracking reactor 2 is operated is generally in the range of from 0.1 to 20 $hr^{-1}$, and, preferably, from 0.1 to 6 $hr^{-1}$, and, more preferably, from 0.2 to 3 $hr^{-1}$. The volumetric ratio of liters of hydrogen to liters of heavy hydrocarbon feedstream introduced into hydrocracking reaction zone 9 is generally in the range of from 80 to 5000 liter/liter, and, usually, from 100 to 2000 liter/liter.

To help in the description herein of the invention, exemplary reaction conditions for diesel gasoil production will be used to provide context for the benefits and improvements achieved by the invention. Any reaction conditions (e.g., temperature, pressure, flow rates, etc.) discussed herein should not be interpreted as limiting the scope of the invention. The hydrocracking reaction conditions described in the herein aforementioned patents can also be illustrative of possible suitable conditions in the operation of the hydrocracking reactor 2 of the inventive process.

In a diesel gasoil production operating mode, a hydrocracker unit processing a heavy feedstock may operate at temperatures in the range of from about 232° C. (450° F.) to about 468° C. (875° F.), depending on the catalyst composition being used, the feed composition and other factors.

The resulting hydrocracker product stream or hydrocracking reactor effluent is yielded from the hydrocracking reaction zone 9 through line 10, and it contains a mixture of lower boiling temperature hydrocarbons as compared to those of the heavy hydrocracker feed stream. The hydrocracker reactor effluent stream forms the basis of the fractionator feed stream that passes through line 11 to be introduced as the fractionator feed to fractionator 4.

In some production processes, the hydrocracker effluent stream may undergo various arrangements of additional reaction, separation, pumping, heating or various combinations of process steps before it reaches fractionator 4. Such steps are well known to those skilled in the art and need not be discussed in detail here. These intermediate steps are generically represented by a process unit 14. Process unit 14 also schematically represents the transformation of the hydrocracking reactor effluent stream into the fractionator feed stream that passes through line 11.

Flow control valve 16 is interposed in line 11 and it controls the flow rate of the fractionator feed stream through line 11 and into fractionator 4. The valves discussed herein are those that are typically utilized by those skilled in the art unless otherwise noted. Also, the valving and flow control mechanisms described herein are controlled by process control equipment or systems known to those skilled in the art and include both automated and manual equipment or systems.

Fractionator 4 is equipped with a multiple or plurality of distillation trays 17. Among the distillation trays is sidedraw tray 22. A "sidedraw tray" as used herein means a fractionator tray that collects and maintains a level of liquid hydrocarbons having a desired boiling range and is designed to allow for the removal of the liquid that collects on the tray.

Fractionator 4 functions as a distillation column that defines within its volume an overall distillation zone 28. Fractionator 4 provides for separating the fractionator feed into several hydrocarbon fractions each of which having a desired boiling range. For instance, light, hydrocarbons which may include a portion thereof as normally gaseous hydrocarbons, are removed from distillation zone 28 by way of line 29 and thereafter recovered. Naphtha boiling range hydrocarbons, or, even kerosene boiling range hydrocarbons, are removed from distillation zone 28 by way of line 30.

A liquid hydrocarbon fraction comprising hydrocarbons boiling in the diesel or gasoil boiling temperature range is yielded from fractionator 4 and taken downstream as a product via line 31.

A heavy hydrocarbon fraction, containing hydrocarbons having a boiling temperature in the temperature range greater than the boiling temperature range of diesel, and, more typically, containing unconverted hydrocarbons of the feedstock, is collected in bottom section 32 of distillation zone 28 of fractionator 4. This heavy hydrocarbon fraction passes from distillation zone 28 via line 33 as a bottoms product stream or as a recycle stream to hydrocracking reactor 2 or a combination of both.

As with hydrocracking reactor 2, the operating conditions of any individual fractionator will vary with the feed and equipment used. But, in a typical diesel gasoil operation, fractionator 4 is operated as an atmospheric distillation unit under such fractionation conditions as are required to provide the various product cuts that are desired. The overhead pressure of fractionator 4 can typically operated at between 25 kPa (3.6 psia) and 500 kPa (73 psia), and the overhead temperature can range upwardly to about 125° C. (257° F.). The bottoms stream from fractionator 4 is recycled by way of lines 33 and 34 as a feed to hydrocracking reactor 2.

Fractionator 4 may also have associated with it additional equipment such as heat exchangers, pumps, charge heaters, etc. Those skilled in the art are capable of adding any additional components needed for a particular system (e.g., adding a pump to provide hydraulic head).

FIG. 1 schematically shows how hydrocracking reactor 2 and fractionator 4 work together to create a hydrocracker reaction loop. The following paragraphs describe how the invention improves operational control of a fractionator and a hydrocracker reaction loop. In very broad terms, the invention encompasses a method of controlling the operation of fractionator 4 in a hydrocracker reaction loop that includes hydrocracking reactor 2.

In one aspect, the method according to the invention comprises the step of providing a hydrocracker effluent through line 11 as a feed stream to fractionator 4. A liquid sidedraw stream is withdrawn from sidedraw tray 22 and passes from the distillation zone 28 by way of line 36. The sidedraw stream contains liquid hydrocarbons having a desired boiling range. The sidedraw stream is then split into a first stream and a product stream. The first stream is returned to distillation zone 28 by way of line 38. The flow rate of the first stream is determined or measured by flow meter or measuring means 40.

Measuring means 40 provides to flow controller 44 an input signal 42 that is indicative of the actual or measured rate of flow of the first stream passing through line 38. Flow controller 44 compares input signal 42 against a set point (not shown) that is indicative of a desired rate of flow of the first stream passing through line 38 and provides control signal 46 to flow control valve 48 that is interposed in line 38. Control signal 46 is proportional to the difference between the measured rate of flow and the desired rate of flow of the first stream of line 38. Flow control valve 48 is actuated or operated in response to control signal 46 so as to maintain the rate of flow of the first stream at the desired rate of flow.

In an embodiment of the invention, the flow rate of the first stream is controlled to a desired flow rate while the flow rate of the product stream passing through line 31 is allowed to vary so as to control the liquid level 39 upon sidedraw tray 22. In this arrangement, the flow rate of the first stream is controlled as described above to a desired fixed rate, and the flow rate of the product stream of line 31 is set so as to control the liquid level 39 upon sidedraw tray 22 to a desired fixed level.

Measuring means 50 provides to level controller 52 an input signal 54 that is indicative of the actual or measured liquid level 39 on sidedraw tray 22. Level controller 52 compares input signal 54 against a set point (not shown) that is indicative of a desired liquid level on sidedraw tray 22 and provides a control signal 56 to flow control valve 58 that is interposed in line 31. Control signal 56 is proportional to the difference between the measured liquid level 39 on sidedraw tray 22 and the desired liquid level on sidedraw tray 22. Flow control valve 58 is actuated or operated in response to control signal 56 so as to maintain the liquid level 39 on sidedraw tray 22 at the desired liquid level 39.

In another aspect, the invention is a method of controlling the operation of fractionator 4 and hydrocracking reactor 2, using multi-step process including: providing fractionator 4 for receiving a hydrocracking effluent as a fractionator feed via lines 10 and 11, wherein fractionator 4 defines an overall distillation zone 28 that includes bottom zone 62, upper zone 64, and intermediate zone 66 between the bottom zone 62 and the upper zone 64. Included within intermediate zone 66 is sidedraw tray 22.

In this aspect of the invention, the fractionator feed is introduced into bottom zone 62 of fractionator 4. In the operation of fractionator 4, a liquid level 39 of hydrocarbons having a desired boiling range is collected or accumulated upon sidedraw tray 22. Liquid level 39 is controlled and maintained by withdrawing a liquid sidedraw stream from the sidedraw tray 22 which passes by way of line 36 typically to a circulating pump 68.

The sidedraw stream is split into a first stream passing through line 38 and a product stream passing through line 31. The first stream is reintroduced into the distillation zone 28 in a controlled fashion whereby the flow rate of the first stream is controlled by use of a control system including measuring means 40, flow controller 44, and flow control valve 48 that controls the flow of the product stream responsive to a difference between a measured flow of the first stream and a desired flow of the first stream.

The flow rate of the product stream is controlled by use of a level control system including level measuring means 50, level controller 52, that controls the flow of the product stream responsive to a difference between a measured liquid level 39 on sidedraw tray 22 and a desired liquid level on sidedraw tray 22, and, thus, the product flow varies during the operation of fractionator 4. The product stream passes downstream of the fractionator 4 through line 31 for sale or further processing.

In the operation of the fractionator 4, the hydrocracking reactor effluent passes from hydrocracking reactor 2 by way of line 10 and line 11 and is provided to fractionator 4 as a feed stream via process unit 14. Typically, the fractionator feed stream is introduced into fractionator 4 toward the bottom of distillation zone 28 into bottom zone 62.

The distillation zone 28 contains a plurality of trays 17 as are commonly found in fractionators. As mentioned above, fractionator 4 further defines within distillation zone 28 an upper distillation zone 64, which provides for the separation of lighter fractions, a bottom distillation zone 62, which provides for the separation of heavier fractions, and an intermediate distillation zone 66 between the upper distillation zone 64 and bottom distillation zone 62, which provides for the separation of intermediate fractions. Each zone contains at least one fractionator tray.

Fractionator 4 is operated so that a diesel gasoil fraction accumulates upon sidedraw tray 22 in intermediate distillation zone 66. Also, a heavy liquid fraction accumulates in the bottom of fractionator 4 to form liquid bottoms level 70. Liquid bottoms level 70 collected in bottom section 32 of fractionator 4 is monitored as known in the art, typically, by the use of level sensor or level measuring means 72. A bottoms product passes from the bottom of fractionator 4 by way of line 33 and can be recycled as a feed to hydrocracking reactor 4 by way of line 34 or a portion or all of the bottoms product may pass to downstream by way of line 72.

Traditional hydrocracker and fractionator control systems are based on monitoring multiple process variables (e.g., the level of fractionator bottoms) and altering others (e.g., temperatures and flow rates) in response to measured values. These systems are often based on a fixed-flow sidedraw product stream. In such systems, the sidedraw tray functions as most fractionator trays and collects a volume of liquid hydrocarbon having a desired boiling point range. A portion of that volume is withdrawn as a product stream at a fixed flow rate controlled by a flow controller and the rest overflows collection tray as internal reflux within the column. Because the quantity of product removed from the fractionator is more or less constant, other streams (e.g., internal reflux) or process parameters are adjusted to keep the product stream flowing and within specification.

The control system and method of the claimed invention alters the traditional method of controlling a hydrocracker and fractionator by altering the typical fractionator architecture and control dynamic. In the method and system according to the invention, the total volume of liquid hydrocarbon collected on the sidedraw tray 22 is withdrawn from fractionator 4 as a sidedraw stream through line 36, and it is split into the product stream of line 31 and the first stream of line 38. In other words, the draw tray does not overflow as in typical fractionators. Furthermore, the first flow rate of the first stream is fixed, thereby making the flow rate of the product stream variable due to it being used to control liquid level 39. The following paragraphs provide more detail regarding this control scheme.

Fractionator 4 of the system comprises at least one sidedraw tray 22 within distillation zone 28 that collects a volume of liquid hydrocarbons having a desired boiling range. This volume of liquid hydrocarbons provides the sidedraw stream through line 36 that is divided or split to provide the product steam of line 31 and first stream of 38. The sidedraw tray 22 operates as a traditional fractionator tray except that it is designed to prevent overflow of collected liquid hydrocarbons. The sidedraw tray 22, thus, is sealed against the internal wall of fractionator 4 so that it does not permit the overflow of liquid to the fractionator trays 17 below sidedraw tray 22. A plurality of chimneys 74 provide for one way vapor flow from bottom zone 62 through sidedraw tray 22 to intermediate zone 66 and to upper zone 64. The volume of liquid hydrocarbons collected on the sidedraw tray 22 is illustrated as liquid level 39.

The system is designed such that the liquid hydrocarbons accumulated upon sidedraw tray 22 are withdrawn through line 36 and passes to circulating pump 68. Flow control valve 58 with level controller 52 controls the release of liquid hydrocarbon collected on the sidedraw tray 22. Flow control valve 58 that is interposed within line 31 controls the product stream flow to maintain the level of liquid level 39. This control balances the system and protects pump 68 and other equipment placed between sidedraw tray 22 and the product outlet. Level measuring means 50 with level controller 52 communicates with control valve 58 and provides for adjustments in the rate of flow of the product stream that are made in response to changes in liquid level 39 on sidedraw tray 22.

The sidedraw stream passes through line 36 to a splitter or divider means 76 via circulating pump 68. As previously noted, intermediate steps or equipment such as coolers may be added by those skilled in the art. Splitter or divider means 76 provides for dividing the sidedraw stream of line 36 into a first stream that passes through line 38 to be introduced into bottom zone 62 and the product stream passing downstream through line 31.

The flow rate of the first stream necessary for efficient operation of fractionator 4 is determined and fixed by an operator (or algorithm). In an embodiment of the invention, it is desired to further split or divide the sidedraw stream of line 36 into an additional or second stream that is returned to and introduced into fractionator 4 but at a different point along distillation zone 28. Thus, in this embodiment, the sidedraw stream of line 36 is further split or divided into a second stream by splitter or divider means which may be splitter means 76 or another separate splitter means (not shown). Splitter means 76, or the other separate splitter means, provides for splitting the sidedraw stream passing through line 36 into a second stream, in addition to the first stream of line 38, that passes through line 78. Both streams are returned to fractionator 4.

The flow rate of the second stream of line 78 as set by the operator (or algorithm) based on desired operational conditions of fractionator 4 and the desired properties of the product stream. In controlling the flow rate of the second stream, flow measuring means 80 provides to flow controller 82 an input signal 84 that is indicative of the actual or measured rate of flow of the second stream passing through line 78. Flow controller 82 compares input signal 84 against a set point (not shown) that is indicative of a desired rate of flow for the second stream passing through line 78 and provides control signal 86 to flow control valve 88, which is interposed in line 78. Control signal 86 is proportional to the difference between the measured rate of flow and the desired rate of flow of the second stream of line 78. Flow control valve 88 is actuated or operated in response to control signal 86 so as to maintain the rate of flow of the second stream at the desired rate of flow for the second stream. The control system that included flow measuring means 80, flow controller 82 and flow control valve 88 controls the flow of the second stream responsive to the difference between the measured flow and the desired flow of the second system.

Although the flow rates of the first stream and the second stream are described as being "fixed", in practice the flow rates of these streams vary on either side of a "setpoint" which is the desired flow rate for the respective streams. Each flow rate is maintained at its set point by a process control scheme based on measuring the flow rate of the stream and comparing the actual or measured flow rate to the desired flow rate for the stream and making necessary adjustments by use of a control valve in order to keep the flow rate within an acceptable range around the setpoint.

In an alternative embodiment of the inventive method, in addition to the step of controlling the flow of the first stream of line 38, the method further includes the step of controlling the flow of a second stream of line 78 responsive to a difference between a measured flow of the second stream of line 78 and a desired flow of the second stream of line 78. The process control equipment used to meter and control the flow of each stream is known to those skilled in the art (e.g., flow meters, controllers and control valves) may be used to monitor, adjust and control the flow rates.

The first stream and second stream are introduced to fractionator 4 in a conventional manner, preferably at points above and below sidedraw tray 22. In an alternative manner, the first stream of line 38 is introduced into the bottom zone 62 of fractionator 4, and the second stream of line 78 is introduced into upper zone 66.

Although the flow rates of the first stream and second stream are fixed and controlled by flow controller systems, the total rate of liquid hydrocarbon withdrawn from sidedraw tray 22 is ultimately set to control liquid level 39.

Since sidedraw tray 22 is designed to prevent overflow, the process provides for withdrawing the entire volume of the liquid hydrocarbon collected on the sidedraw tray 22 instead of having a portion thereof passing through tray downcomers to the bottom zone 62. Because the first and second stream flow rates are fixed, variations in the liquid flow within the column are reflected by variations in the product stream flow of line 31 as explained above.

However, a problem could occur if liquid level 39 upon sidedraw tray 22 becomes too low. In such an instance, there could be insufficient volume of liquid for the sidedraw stream to fill circulating pump 68, which can potentially cause damage to the pump. This problem is prevented by setting the flow rate of the product stream of line 31 on level control, which controls the withdrawal rate of liquid from sidedraw tray 22 so as to control level 39.

As an example of how this works, if the measured liquid level 39 falls below a desired liquid level, the product stream flow is reduced so as to allow liquid level 39 to rise to the desired level. This prevents damage to pump 68 and helps to maintain the desired internal column reflux flow rate.

From a process control viewpoint, this control system addresses the quandary faced by an operator of a traditional hydrocracker unit fractionator; because, it eliminates fractionator related variables from addressing the questions of "why is the bottoms level rising" or "why is there an increase in bottoms yield." The quality of the fractionator bottoms (e.g., initial boiling point) and the sidedraw stream (e.g., boiling end point) are fixed by temperature. The entire volume of product generated by the system is withdrawn as a sidedraw stream. This eliminates the question of whether there is insufficient withdrawal rate of product from the sidedraw tray. The internal reflux flow rate is set and the flow rate of the product stream is allowed to vary in response to the volume of liquid on the draw tray and the internal reflux rate. Therefore, if an increase in fractionator bottoms yield is observed, an operator (or algorithm) knows that the cause of the increase is insufficient conversion in the hydrocracker rather than insufficient separation in the fractionator.

Stated alternatively, one particular advantage of the method and system of the invention is that variations in the column's internal liquid flow are expressed in the product flow instead of in the column internal reflux as is typical in systems that utilize sidedraw trays with overflow. Early experimental prototypes of the method and system according to the invention have demonstrated that practice of the invention can reduce the percentage of gasoil found in hydrocracker unconverted oil recycle fractions by as much as from 10% to 25%.

The method according to the invention also comprises the step of monitoring the yield of fractionator bottoms by monitoring the liquid bottoms level 70 in fractionator 4 and the rate of flow of bottoms product through line 33, and, then, adjusting the temperature or other operating conditions of the hydrocracking reactor 2 based on changes in the measured yield of bottoms product. The adjustment in temperature can be made manually (as is often the case) or automatically or a combination of both using control systems known in the art.

In general, when the bottoms yield from fractionator 4 increases as reflected in either an increasing liquid bottoms level 70 or an increased bottoms product flow through line 33, i.e., the sum of flows through lines 34 and 72, the operating conditions of the hydrocracking reactor 2 are adjusted in response to the change in bottoms yield so as to increase the conversion of the heavy hydrocarbon feedstream passing through line 6. Alternatively, in response to a decrease in the bottoms yield from fractionator 4, the operating conditions of the hydrocracking reactor 2 are adjusted so as to decrease the conversion of the heavy hydrocarbon feedstream.

That which is claimed is:

1. A method of controlling the operation of a fractionator and hydrocracker reaction loop, wherein said method comprises:

providing a fractionator for receiving a hydrocracker effluent yielded from a hydrocracker reactor as a fractionator feed, wherein said fractionator defines a distillation zone that includes a bottom zone, an upper zone, and an intermediate zone between said bottom zone and said upper zone, wherein said intermediate zone has a sidedraw tray;

introducing said fractionator feed into said bottom zone of said fractionator;

collecting on said sidedraw tray a liquid level of hydrocarbons having a desired boiling range;

withdrawing a sidedraw stream of said hydrocarbon from said sidedraw tray;

separating said sidedraw stream into a first stream and a product stream;

introducing said first stream to said distillation zone;

responsive to a difference between a measured flow of said first stream and a desired flow of said first stream, controlling the flow of said first stream;

responsive to a difference between a measured liquid level on said sidedraw tray and a desired liquid level on said sidedraw tray, controlling the flow of said product stream; and passing said product stream downstream of said fractionator.

2. A method according to claim 1, wherein the step of separating said sidedraw stream further comprises: separating said sidestraw stream into a second stream; and controlling the flow of said second stream responsive to a difference between a measured flow of said second stream and a desired flow of said second stream.

3. A method according to claim 2, further comprising: introducing said first stream into said bottom zone; and introducing said second stream into said upper zone.

4. A method according to claim 1, further comprising: monitoring a bottoms yield of said fractionator; and adjusting in response to changes in said bottoms yield said hydrocracker reactor conditions.

5. A method according to claim 1, wherein said sidedraw tray is sealed and does not permit the overflow of liquid.

* * * * *